UNITED STATES PATENT OFFICE.

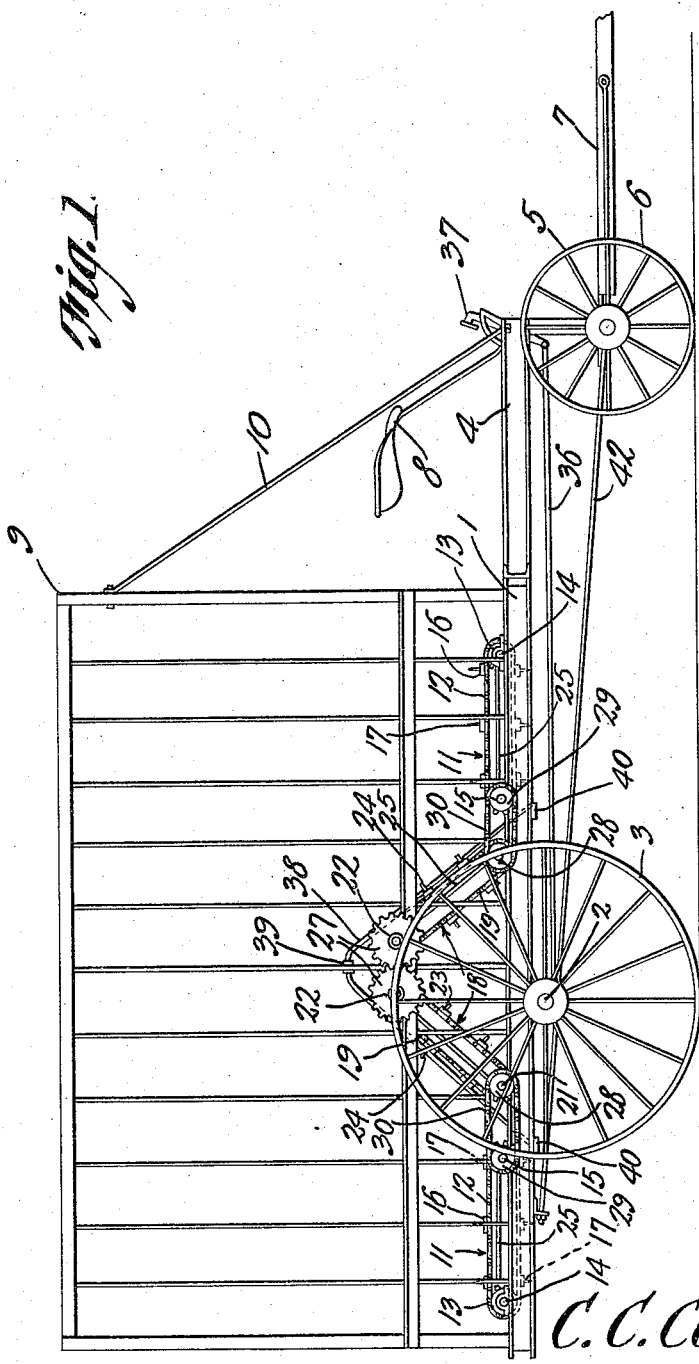

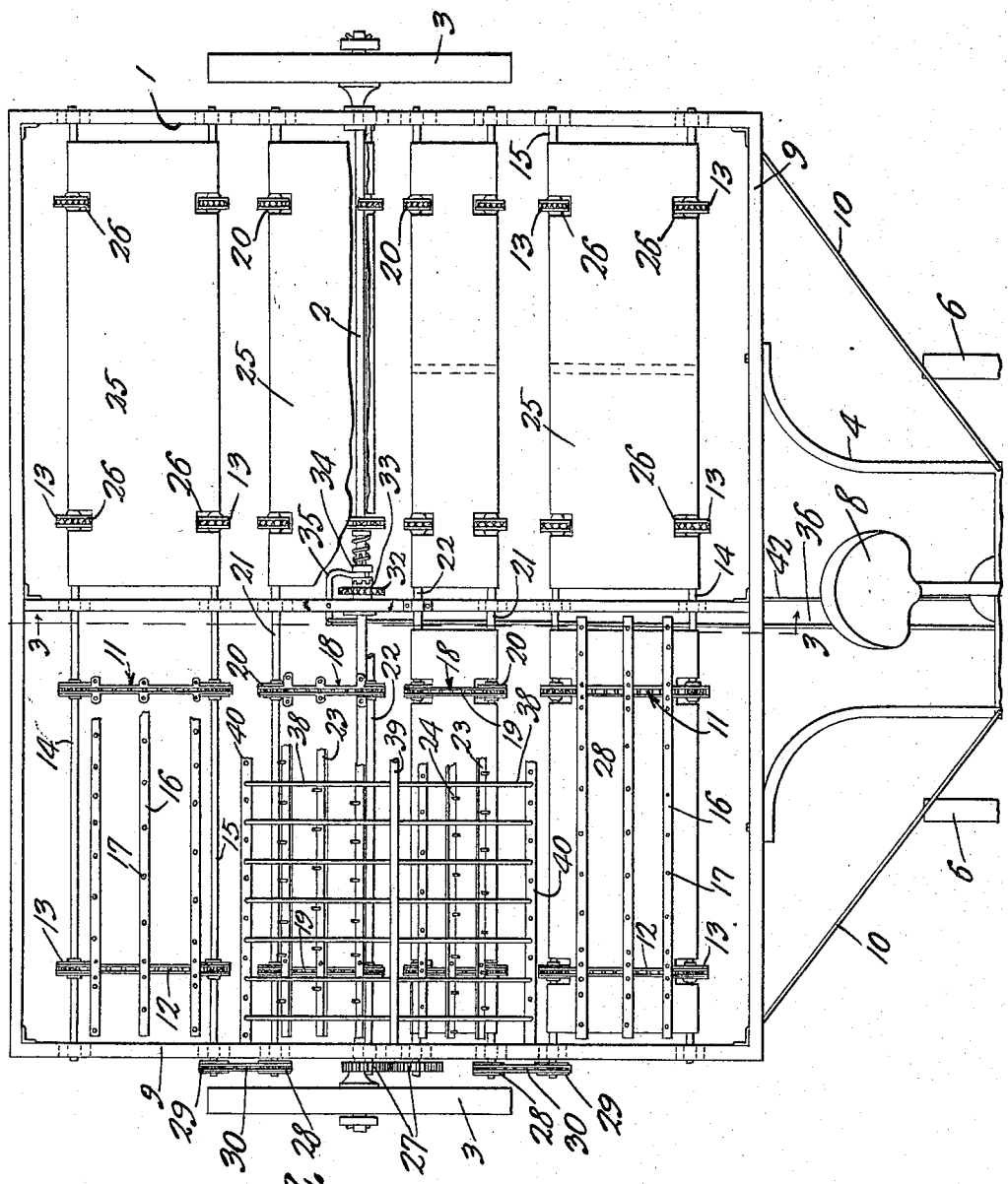

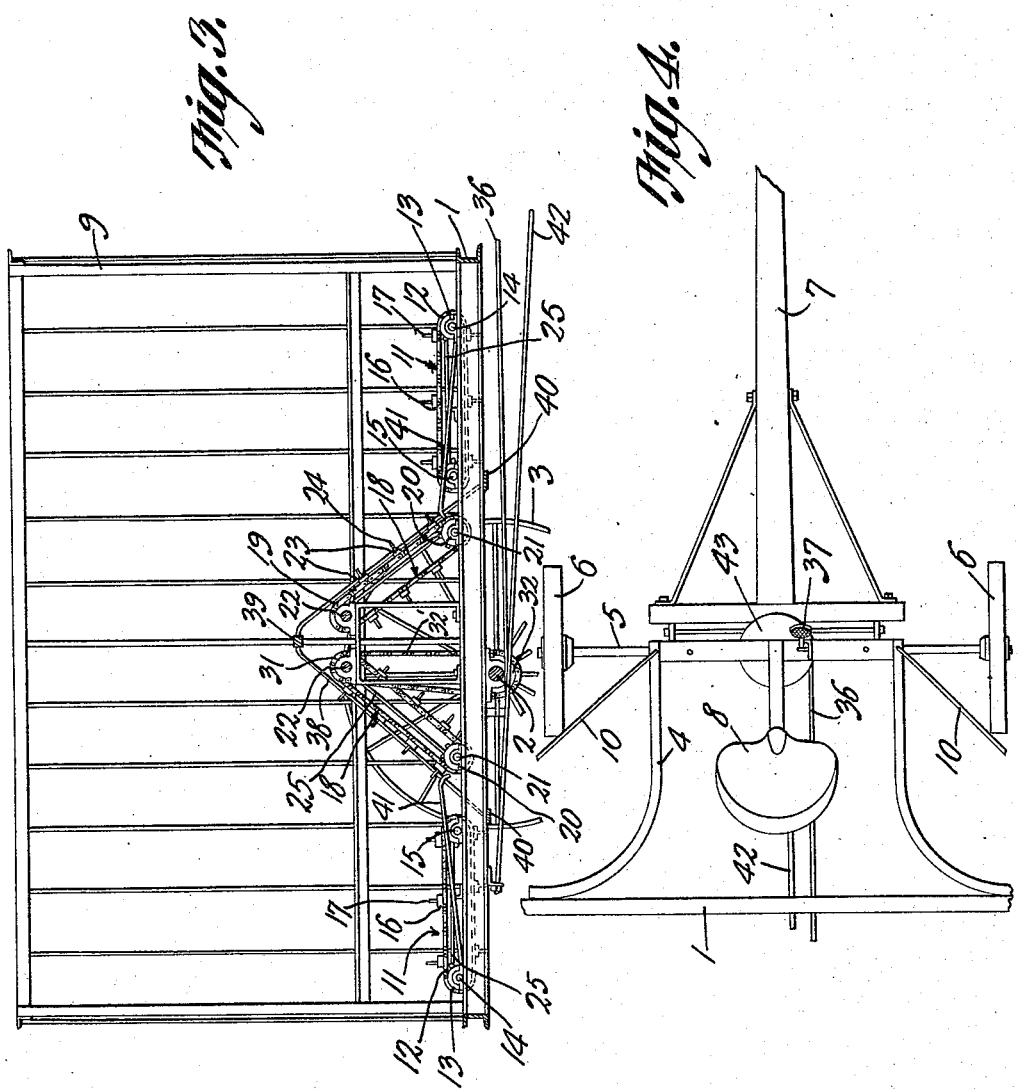

CECIL C. COOPER, OF WICHITA, KANSAS.

STRAW-SPREADER.

1,185,777. Specification of Letters Patent. Patented June 6, 1916.

Application filed August 30, 1915. Serial No. 48,132.

*To all whom it may concern:*

Be it known that I, CECIL C. COOPER, a citizen of the United States, residing at Wichita, in the county of Sedgwick and State of Kansas, have invented a new and useful Straw-Spreader, of which the following is a specification.

The present invention appertains to straw spreaders, and aims to provide a novel and improved appliance of that character.

It is the object of the invention to provide a wheel mounted straw spreader having a receptacle for holding the straw, and having a unique means for delivering and scattering the straw, whereby the straw will not only be delivered in a uniform and effective manner, but will also be agitated and kept in motion within the receptacle to prevent the straw being packed during the movement of the machine over the ground, and whereby the device is operable for discharging and scattering dry, wet, long or short straw, chaff, or equivalent material with equal success.

It is also within the scope of the invention to provide the straw spreader with improved features of construction whereby the utility and efficiency thereof will be enhanced.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the improved straw spreader, a portion of the tongue being broken away. Fig. 2 is a plan view of the machine, portions being broken away. Fig. 3 is a longitudinal section taken on the line 3—3 of Fig. 2. Fig. 4 is a fragmental plan view illustrating the forward portion of the frame and steering gear.

In carrying out the invention, there is employed a vehicle embodying a rectangular skeleton frame 1 constructed of suitable material, and mounted upon a rotatable axle 2 which is journaled to the frame between the forward and rear ends thereof, and suitable ground wheels 3 are secured upon the protruding ends of the axle 2 at the sides of the frame 1. The forwardly projecting portion 4 of the frame is mounted upon the steering axle 5 which has the steering wheels 6 journaled thereon, and a tongue 7 is attached to the axle 5, whereby the spreader may be drawn over the ground by means of draft animals, although it will be understood that the device may be moved over the ground in any suitable manner. The forward portion 4 of the frame carries a seat 8 for the operator.

The frame 1 is provided with an upstanding receptacle or hopper 9 of frame-like construction, as clearly illustrated in the drawings, and the front corner posts of the receptacle 9 are connected by stays 10 to the forward end portion 4 of the frame, to assist in holding the receptacle 9 firmly in place upon the frame.

Forward and rear pairs of endless conveyer belts 11 are carried by the frame 1 at the bottom of the receptacle 9, and the conveyer belts 11 are disposed horizontally or parallel with the frame 1 adjacent the forward and rear ends of the frame. Each of the belts 11 embodies endless sprocket chains 12 which are trained around sprocket wheels 13. These sprocket wheels 13 are secured upon transverse shafts 14 journaled upon the frame 1 adjacent the forward and rear ends thereof, and transverse shafts 15 journaled upon the frame between the shafts 14 and the central portion of the frame. The sprocket chains 12 of each belt 11 carry transverse slats 16, which have outstanding teeth or fingers 17 for engaging the straw.

Inclined endless conveyer belts 18 are disposed between the belts 11, the belts 18 being arranged in forward and rear pairs adjacent the central portion of the frame, and the belts 18 are inclined from the adjacent portions or shafts 15 of the belts 11 toward the central portion of the machine. Each of the belts 18 embodies endless sprocket chains 19 trained around sprocket wheels 20. The sprocket wheels 20 are secured upon two shafts 21 and two shafts 22. The shafts 21 are journaled upon the frame 1 adjacent but spaced from the shafts 15, the shafts 21 being disposed between the shafts 15, and the shafts 22 are journaled to the frame-work of the receptacle 9 adjacent one another and at a point suitably above the frame 1. The shafts 22 are spaced apart, and are located above the horizontal plane in which the shafts 14, 15 and 21 are located. Each of the belts 18 embodies transverse slats 23 secured to the chains 19 and having outstanding teeth or fingers 24. The adjacent or upper portions of the belts 18 are spaced apart to provide a discharge or delivery slot therebetween, as clearly apparent by reference to Figs. 2 and 3.

An apron 25 is supported between the upper and lower runs or flights of each of the belts 11 and 18, and the aprons 25 are supported by the respective shafts 14, 15, 21 and 22. The aprons 25 have openings or recesses 26 for accommodating the sprocket wheels which carry the belts. It will be noted that there are a pair of forward belts 11, a pair of forward belts 18, a pair of rear belts 18, and a pair of rear belts 11, and that the belts of the respective pairs are located at the opposite sides of the longitudinal median line of the frame.

As a means for operatively connecting the belts whereby they operate properly, intermeshing spur gears 27 are secured upon the shafts 22 whereby the upper runs of the belts 18 move upwardly toward one another. Sprocket wheels 28 are secured upon the shafts 21, and sprocket wheels 29 are secured upon the shafts 15, endless sprocket chains 30 passing around the respective pairs of sprocket wheels 28 and 29 for operatively connecting the belts 11 and 18. In this manner, when the upper runs of the belts 18 move upwardly toward one another, the upper runs of the belts 11 will move toward one another and toward the receiving portions of the belts 18.

The belts are driven from the axle 2, and to this end a sprocket wheel 31 is secured upon one of the shafts 22, and a sprocket wheel 32 is mounted loosely upon the axle 2 below the sprocket wheel 31. An endless sprocket chain 33 is trained around the sprocket wheels 31 and 32, and the sprocket wheel 32 is provided with a clutch hub 34 coöperating with a clutch member 35 feathered upon the axle 2 adjacent the sprocket wheel 32. A lever 35 fulcrumed to the frame 1 is operatively engaged to the clutch member 34, and is connected by a rod 36 to a foot lever 37 pivoted to the forward end of the frame adjacent the operator's seat 8, whereby the foot lever 37 may be readily operated for moving the clutch member 34 into and out of engagement with the clutch hub 33 of the sprocket wheel 32. When the clutch member 34 engages the hub of the sprocket wheel 32, the sprocket wheel 31 will be rotated by the axle, and this will result in the belts being operated, as will be apparent, and when the clutch member 34 is disengaged from the sprocket wheel 32, the connection between the axle and belts will be broken to stop the belts.

Opposite sets of inclined rods 38 are supported immediately above the upper runs of the belts 18, the rods 38 being inclined toward one another from between the respective shafts 15 and 21. The upper ends of the rods 38 are attached in any suitable manner to a single transverse bar 39 supported by the frame work of the receptacle 9, and the lower or remote ends of the rods 38 are supported by a pair of transverse bars 40 carried by the frame 1 between the respective belts 11 and 18. The rods 38 are arranged close adjacent the upper runs of the belts 18, and the fingers 24 of the belts 18 project upwardly between the rods 38 to engage the straw resting upon the rods.

Two guards 41 have their remote ends secured upon the frame 1 adjacent the forward and rear ends of the frame, and project toward one another between the belts 18 of the two pairs. The guards 41 are inclined toward the central portion of the frame, and their free portions project across the slot between the respective belts 11 and 18, as clearly seen by reference to Fig. 3. The guards 41 have the office of supporting the straw between the belts 11 and 18.

An inclined stay rod 42 connects the rear portion of the frame 1 and the king bolt or fifth wheel 43 of the front axle 5, whereby the draft will be properly transmitted from the axle 5 to the frame 1, to avoid a breakage of the structure when the same is pulled about by the draft animals.

In operation, after the receptacle 9 is filled with straw, and when the device is properly run onto the field where the straw is to be spread, the operator presses the foot lever 37 to bring the clutch member 34 into engagement with the clutch hub 33 of the sprocket wheel 32. This will connect the axle and belts, so that the belts will operate, the upper runs of the belts 11 moving toward the belts 18, and the upper runs of the belts 18 moving upwardly toward one another from the discharge portions of the belts 11. The belts 11 and 18 support the straw, and the teeth 17 and 24 in engaging the straw will naturally carry the straw with the upper runs of the belts. The straw will thus be caught by the belts 11 and moved from the forward and rear ends of the frame toward the center of the frame, and the straw delivered by the belts 11 will be caught up by the belts 18 and carried upwardly along the rods 38. Since the fingers 24 move toward one another and then downwardly over the shafts 22, they will carry the straw downwardly through the slot between the adjacent portions of the belts 18, and the straw will thus be discharged onto the ground in a uniform and efficient manner from between the belts 18 and on a line transversely of the machine. Attention is directed to the fact that the straw being carried from the forward and rear ends of the frame and thence upwardly within the central portion of the receptacle 9, will tend to agitate the straw within the receptacle to prevent the same from packing. The straw being carried upwardly along the rods 38 will tend to cause the straw to bulge upwardly at the center, and the straw being carried upwardly at the center will tend to cause the straw to accumulate at the center of the receptacle. When the straw accumulates sufficiently at the center of the receptacle to remove the straw from the ends of the receptacle sufficiently, the straw will tumble or fall from the center of the receptacle toward the ends thereof. This will serve to agitate and loosen the straw, the said motion being continued as long as the machine is in operation, and due to the fact that the straw is carried horizontally by the belts 11 and then taken up and carried upwardly at an angle by the belts 18 also serves to agitate and loosen the straw that passes from the belts 11 to the belts 18. As a result, the straw is not only discharged in a uniform and efficient manner, but it is also thoroughly agitated or kept in motion within the receptacle 9. This enables various grades of straw, chaff or equivalent material, to be delivered with equal success, and the machine will operate properly with either dry or wet straw, or with long or short straw.

The present structure has other advantages and attributes which will be apparent from the foregoing, taken in connection with the drawings.

Suitable shields may be provided for covering the gears 27 and sprocket wheel 32 if desired.

Having thus described the invention, what is claimed as new is:

1. In a spreading mechanism, a receptacle, a pair of devices coöperating with one another within the receptacle for carrying the material upwardly on an incline and discharging the material downwardly between said devices, and means for conveying the material from opposite portions of the receptacle to said devices.

2. In a spreading mechanism, a receptacle, endless conveyer belts inclined toward one another within the receptacle for carrying the material upwardly and discharging the material downwardly between the upper portions of said belts, endless conveyer belts within the receptacle for carrying the material from opposite portions of the receptacle to the lower portions of the inclined belts, and means for mounting and operating the belts.

3. In a spreading mechanism, a receptacle, endless conveyer belts disposed within the receptacle and inclined toward one another for carrying the material upwardly and discharging it downwardly between the upper portions of said belts, means for mounting and operating said belts, and rods inclined toward one another and disposed immediately above and adjacent the upper runs of said belts, the belts having fingers projecting upwardly between said rods to engage the material.

4. In a spreading mechanism, a receptacle, endless conveyer belts inclined toward one another within the receptacle, horizontal endless conveyer belts disposed in the plane of the lower portions of the first mentioned belts, the upper runs of the first mentioned belts moving upwardly toward one another and the upper runs of the second mentioned belts moving toward the first mentioned belts, sets of rods inclined toward one another and disposed immediately above and adjacent the upper runs of the first mentioned belts, the first mentioned belts having outstanding fingers to project upwardly between said rods, and means for mounting and operating said belts.

In testimony that I claim the foregoing as my own, I have hereto affixed my signature in the presence of two witnesses.

CECIL C. COOPER.

Witnesses:
H. C. ROYSTON,
T. C. CARVER.

Copies of this patent may be obtained for five cents each, by addressing the "Commissioner of Patents, Washington, D. C."